United States Patent [19]

Shirai

[11] Patent Number: 5,163,294
[45] Date of Patent: Nov. 17, 1992

[54] TURBOCHARGER WITH COUPLING BETWEEN COMPRESSOR ROTORS

[75] Inventor: Makoto Shirai, Kariya, Japan
[73] Assignee: Aisin Seiki Kabushiki Kaisha, Kariya, Japan
[21] Appl. No.: 701,863
[22] Filed: May 17, 1991
[30] Foreign Application Priority Data
  May 17, 1990 [JP] Japan .................. 2-51519[U]
[51] Int. Cl.$^5$ ............................... F02B 37/12
[52] U.S. Cl. ........................ 60/602; 60/605.1
[58] Field of Search ............. 60/605.1, 607, 608, 60/602

[56] References Cited

U.S. PATENT DOCUMENTS

| 1,895,538 | 1/1933 | Buchi | 60/605.1 |
| 4,339,922 | 7/1982 | Navarro | 60/605.1 X |

FOREIGN PATENT DOCUMENTS

| 61-83454 | 4/1986 | Japan . |
| 61-200331 | 9/1986 | Japan . |
| 61-210223 | 9/1986 | Japan . |
| 61-294131 | 12/1986 | Japan . |
| 298620 | 12/1987 | Japan | 60/605.1 |
| 63-129120 | 6/1988 | Japan . |

Primary Examiner—Michael Koczo
Attorney, Agent, or Firm—Oblon, Spivak, McClelland, Maier & Neustadt

[57] ABSTRACT

A turbocharger for supercharging an engine provided with an intake pipe and an exhaust pipe including a main pipe and a branched pipe disposed in parallel thereto includes a compressor rotor disposed in the intake pipe, a first turbine rotor disposed in the main pipe so as to be rotated by the pressure of the exhaust fluid therein and connected to the compressor rotor for the rotation thereof, a second turbine rotor disposed in the branched pipe so as to be rotated by the pressure of the exhaust fluid therein, a coupling device for establishing the connection between the first and second turbine rotors when the either of the turbine rotors is brought into rotation at a speed above a set value, a valve disposed between the main pipe and the branched pipe and being normally closed for interrupting the fluid communication therebetween, a sensor for detecting the rotational speed of the first or the second turbine rotor and a control device for opening the valve based on a signal from the sensor when the detected rotational speed exceeds the set value.

6 Claims, 4 Drawing Sheets

TURBOCHARGER WITH COUPLING BETWEEN COMPRESSOR ROTORS

BACKGROUND OF THE INVENTION

The present invention relates to a turbocharger for supercharging an engine.

In order to supercharge an engine of a vehicle effectively, a turbocharging system has been provided in which two different turbochargers are incorporated. In this system, a small sized turbocharger only is driven in case of small amount of the exhaust gas from the engine and both turbochargers are driven in case of large amount of the exhaust gas. In light of the fact that a small turbine rotor has small inertia, there is improved responsiveness for low rotation speeds of the engine.

However, the employment of two different turbochargers increases the weight of the vehicle and the complexity of the piping around the engine.

SUMMARY OF THE INVENTION

It is, therefore, a primary object of the present invention to provide a turbocharger which is equivalent to the foregoing system in function.

To achieve the objects and in accordance with the purposes of the present invention, a turbocharger for supercharging an engine provided with an intake pipe and an exhaust pipe including a main pipe and a branched pipe disposed in the parallel thereto comprises a compressor rotor disposed in the intake pipe; a first turbine rotor disposed in the main pipe so as to be rotated by the pressure of the exhaust fluid therein and connected to the compressor rotor for the rotation thereof; a second turbine rotor disposed in the branched pipe so as to be rotated by the pressure of the exhaust fluid therein; coupling means for establishing the connection between the first and the second turbine rotors when the either of the turbine rotors is brought into rotation at a speed above a set value; a valve disposed between the main pipe and the branched pipe and being normally closed for interrupting the fluid communication therebetween; a sensor for detecting the rotational speed of the first or the second turbine rotor; and control means for opening the valve based on a signal from the sensor when the detected rotational speed exceeds the set value.

BRIEF DESCRIPTION OF THE DRAWINGS

The above and other objects, features and advantages of the present invention will be become more apparent and more readily appreciated from the following detailed description of preferred exemplary embodiments of the present invention, taken in connection with the accompanying drawings, in which.

DETAILED DESCRIPTION OF THE PREFERRED EMBODIMENTS

Figure 1:
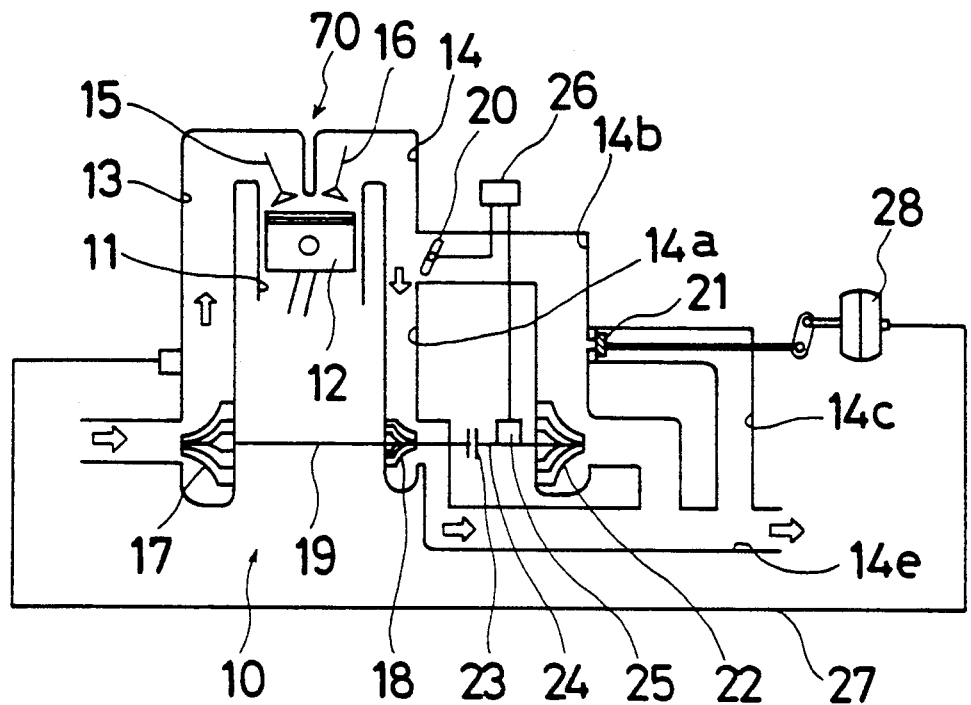
FIG. 1 is a schematic view of a first embodiment of a turbocharger according to the present invention.

Referring now to FIG. 1 wherein a first embodiment of the present invention is illustrated, an engine 70 includes a plurality of cylinders 11 (only one is shown) in which respective pistons 12 (only one is shown) are fitted so as to be moved reciprocably. The cylinder 11 is connected with an intake pipe 13 and an exhaust pipe 14, via an intake valve 15 and an exhaust valve 16, respectively.

A turbocharger 10 has a compressor rotor 17 which is disposed in the intake pipe 13. A turbine rotor 18 is disposed in a first branched exhaust or main pipe 14a which is branched from the exhaust pipe 14, and is connected to the compressor rotor 17 via a rod 19.

From the exhaust pipe 14, the first branched exhaust pipe 14a and a second branched exhaust pipe 14b with a third branched exhaust pipe 14c are branched. At a portion where the second branched exhaust pipe 14b is branched from the first branched exhaust pipe 14a, there is disposed a valve 20. Similarly, a valve 21 is disposed at a portion where the third branched portion 14c is branched from the second branched exhaust pipe 14b. These branched exhaust pipes meet a fourth exhaust pipe 14e.

Within the second exhaust pipe 14b, there is provided a turbine rotor 22 which is larger than the first turbine rotor 18 in radius, and is connected thereto via a second shaft 24 and a coupling means 23.

A sensor 25 which is of well-known construction is provided at a neighboring portion of the second shaft 24 for detecting the rotating condition thereof and an output signal from the sensor 25 is transmitted to a controller 26 which is in the form of a micro-processor so as to serve for controlling the opening/closing operation of the valve 20 which is under the control of the controller 26.

Figure 2:
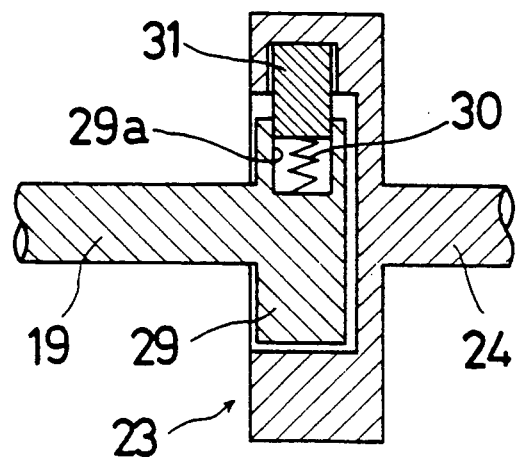
FIG. 2 is a cross-sectional view of a coupling means of the turbocharger in FIG. 1.
Figure 3:
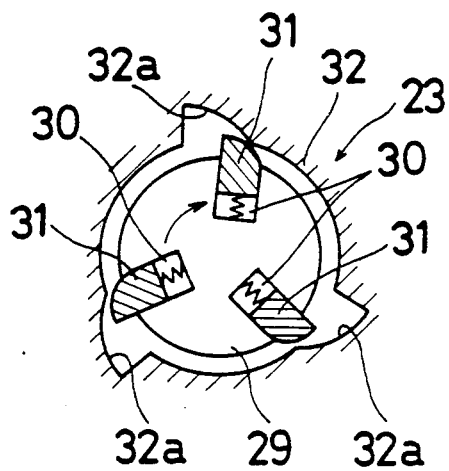
FIG. 3 and FIG. 4 show different operations of the coupling means.
Figure 4:
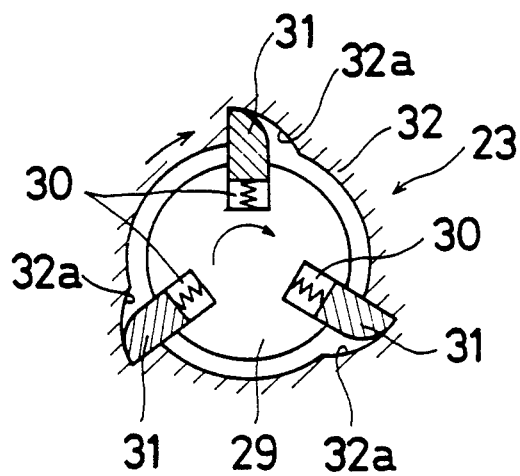

Referring FIGS. 2 through 4, a detailed description of the coupling means 23 will be made. The first shaft 19 is formed integrally at its one end portion with an output member 29 which is provided with three equally pitched grooves 29a. In each groove 29a, there is fitted a pawl member 31 urged inwardly in the radial direction by a spring 30 disposed between a bottom of the groove 29a and the pawl member 31. On the other hand, the second shaft 24 is formed integrally with an input member 32 having a concaved portion for accommodating therein the output member 29, the spring 30 and the pawl 31.

An inner surface of the concave portion is provided with a plurality of grooves 32a each of which is of sector configuration in cross-section for receiving therein the respective pawls 31. An outer periphery of each pawl 31 is formed into a configuration similar to that of the groove 32a.

An operation of the foregoing turbocharger 10 will be described hereinbelow. As the rotational speed of the engine 70 is increased as a function of the accelerator opening or throttle opening, the pressure in the exhaust pipe 14 is increased. When the exhaust pressure in the exhaust pipe 14 is low, only the first turbine rotor 18 is rotated due to the closure of the valve 20. Thus, the compressor rotor 17 is brought into rotation together with the first shaft 19 and the engine 70 is supercharged. At this time, through the rotational force of the first turbine rotor 18 is applied to the output member 29 of the coupling means 23, due to small rotational of the rotor 18 and the force of the spring 30, the engagement between each pawl 31 and corresponding groove 32a is not established.

When the exhaust pressure in the exhaust pipe 14 becomes higher, the rotational speed of the first shaft 19 becomes high, thereby establishing the engagement between each pawl 31 and corresponding groove 32a after overcoming the while stretching each spring 30. Thus, the coupling of the output member 29 with the input member 32 is completed, resulting in the unitary rotation of the first shaft 19 and the second shaft 24. Under the resulting condition, due to the continual detection of the rotational speed of the second shaft 24 by the sensor 25, if the detected rotational speed exceeds a set value of the controller 26, valve 20 is opened and the exhaust pressure in the exhaust pipe 14 also flows into the branched exhaust pipes 14a and 14b with the result that the first turbine rotor 18 and the second turbine rotor 22 are brought into rotations, respectively.

At this time, due to the fact that the first shaft 19 and the second shaft 24 are coupled to each other by the coupling means 23 to be moved in a unitary mode, the compressor rotor 17 is driven by both of the turbine rotors 17 and 18. Thus, the supercharging power or ability is larger than that when driven by only the first turbine rotor 18. In addition, the pressure in the intake pipe 13 is set to be supplied into an actuator 28 via a passage 27. This leads to the opening of the valve 21 by the actuator 28 when the pressure in the intake pipe 13 exceeds a set value. Thus, the pressure in the second exhaust pipe 14b is bypassed to the third exhaust pipe 14c, thereby decreasing the exhaust pressure for driving the second turbine rotor 22. This decreases the supercharging pressure from the compressor rotor 17, resulting in a pressure-drop to a lower value in the intake pipe 13.

As mentioned above, in the structure of the turbocharger 10 according to the first embodiment of the present invention, only the first turbine rotor 18 is set to be driven when the pressure in the exhaust pipe 14 is low. Thus, the second turbine rotor 22 can't be driven by a low exhaust pressure, thereby improving responsiveness and the supercharging efficiency.

Figure 5:
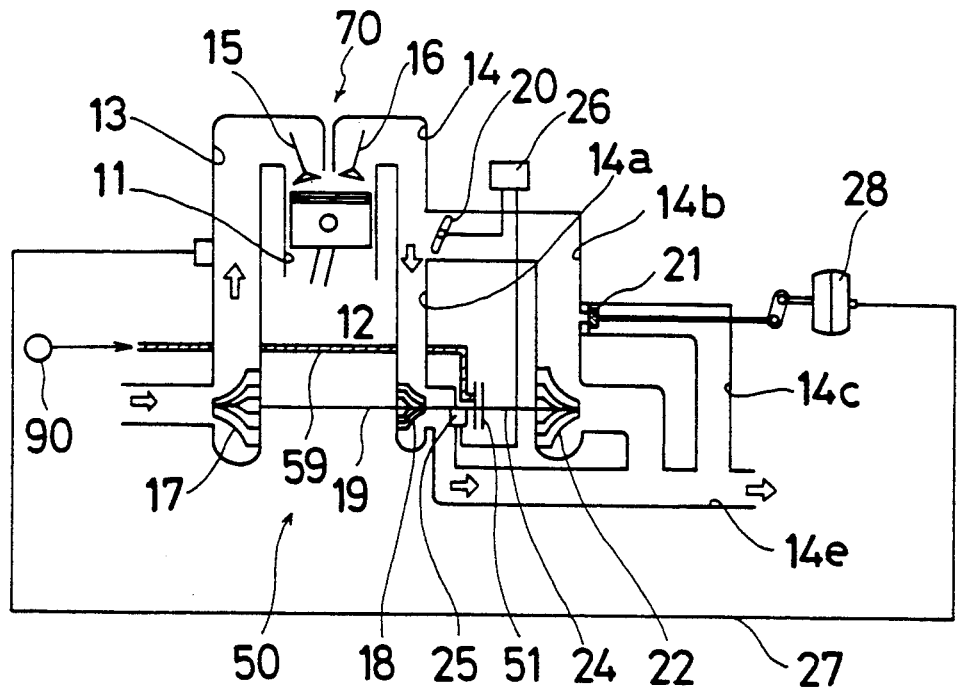
FIG. 5 is a schematic view of a second embodiment of a turbocharger according to the present invention.

Hereinafter, a second embodiment of the present invention will be described referring to FIGS. 5 through 7. However, since both embodiments are identical except for a coupling means 51 of the second embodiment both embodiments are identical, only the coupling means 51 will be detailed and the description of the remaining portion is omitted.

Figure 6:
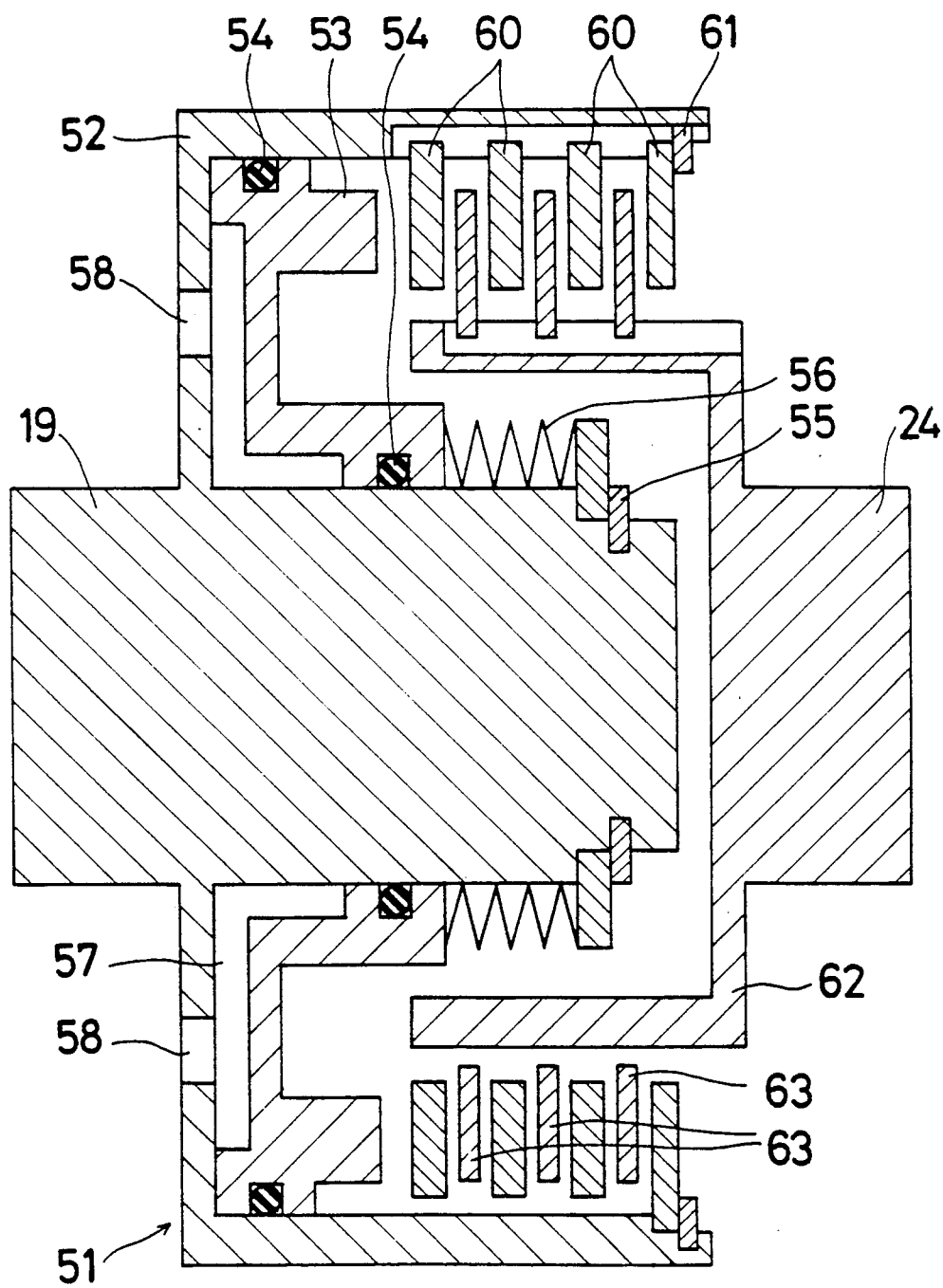
FIG. 6 and FIG. 7 show different operations of another coupling means.
Figure 7:
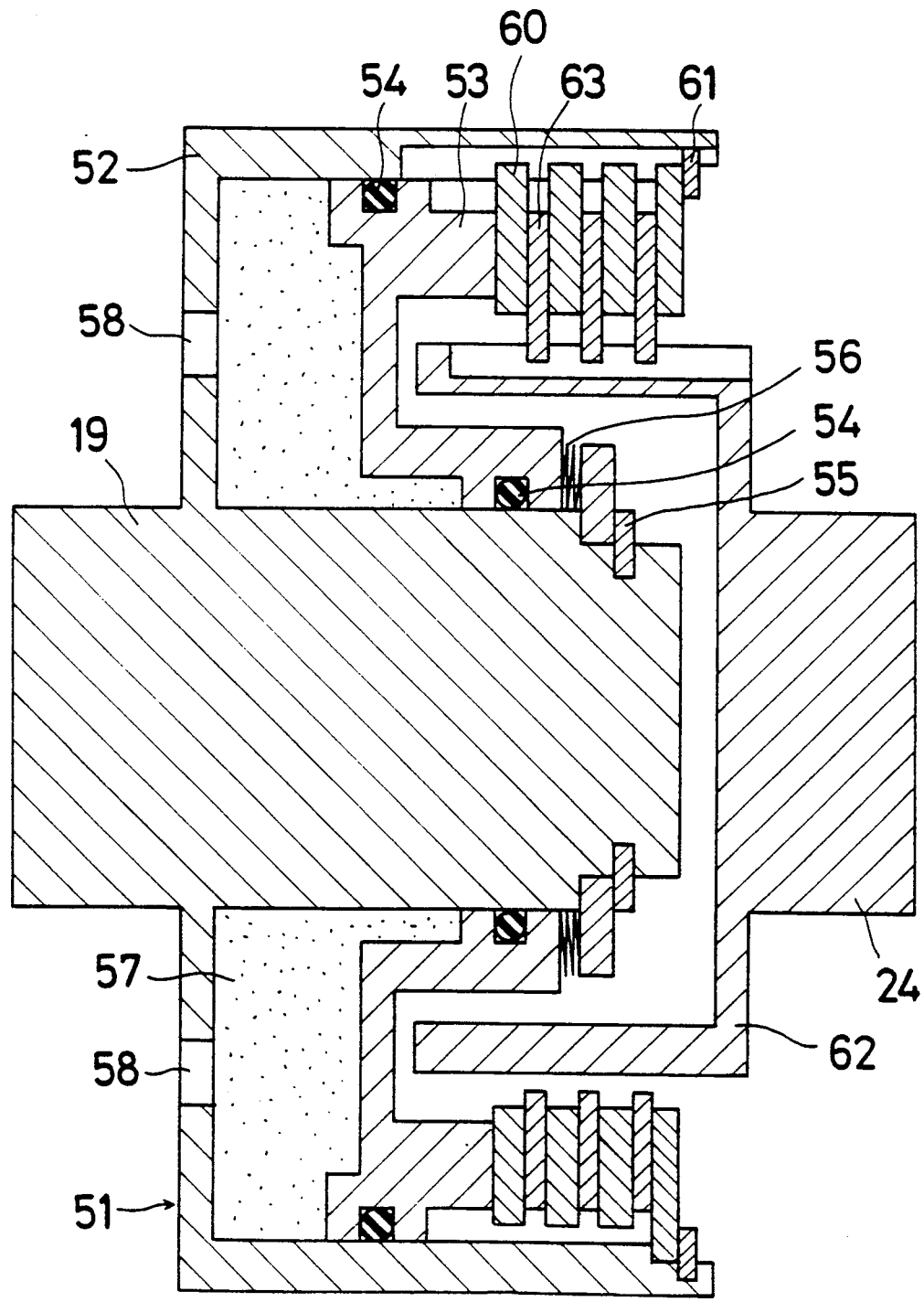

As shown in FIGS. 6 and 7, the coupling means 51, which is in the form of a fluid pressure actuated multi-plate clutch, has an input shaft 19 formed thereon integrally with a cup-shaped output member 52. Between an outer surface of the input shaft 19 and an inner surface of the output member 52, there is mounted a piston 53 so as to be slidable in the axial direction.

A pair of sealing members 54 are provided for assuring the fluid-tightness between the piston 53 and the input shaft 19 and the fluid-tightness between the piston 53 and the output member 52 respectively. A spring 56 is disposed between an inside portion of the piston 53 and a ring 55 secured on the first shaft 19 for urging the piston 53 in the leftward direction in the Figure.

A space 57, which is defined by the piston 53, the first shaft 19 and the output member 52, serves as a fluid pressure chamber which is in fluid communication with a fluid source 90 via a pipe 59 and an aperture 58. Plural output clutch plates 60 are connected to the output member 52 and the retention thereof is established by a ring 61. On the other hand, the second shaft 24 is formed thereon integrally with an input member 62 having plural input clutch plates 63 which are engageable with respective output clutch plates 60. A rotating sensor 25 which is of a well-known construction is mounted on the first shaft 19.

Hereinafter an operation of the second embodiment will be described with respect to the matters different from the first embodiment. If the rotational number of the first shaft 19 is judged to be less than a set value by the controller 26 based on the signal from the sensor 25, an amount of fluid under high pressure is supplied from the fluid source 90 to the fluid pressure chamber 57, thereby moving the piston 53 in the rightward direction against the biasing force of the spring 56. Thus, due to the resulting movement of the piston 53, the output clutch plates 60 are brought into engagement with respective input clutch plates 63, thereby establishing the unitary rotation of the first shaft 19 and the second shaft 24. At this time, due to the opening of the valve 20 as mentioned above, the second turbine rotor 22 is serves for driving the compressor rotor 17 in addition to the first turbine rotor 18. Thereafter, upon the pressure drop in the exhaust pipe 14, the fluid supply from the fluid source 90 to the fluid pressure chamber 57 terminates.

Obviously, numerous modifications and variations of the present invention are possible in light of the above teachings. It is therefore to be understood that within the scope of the appended claims, the invention may be practiced otherwise than as specifically described herein.

What is claimed is:

1. A turbocharger for supercharging an engine provided with an intake pipe and an exhaust pipe including a main pipe and a branched pipe disposed in parallel thereto, comprising:

a compressor rotor disposed in the intake pipe;

a first turbine rotor disposed in the main pipe so as to be rotated by the pressure of the exhaust fluid therein and connected to the compressor rotor for the rotation thereof;

a second turbine rotor disposed in the branched pipe so as to be rotated by the pressure of the exhaust fluid therein;

coupling means for establishing the connection between the first and the second turbine rotors when one of the turbine rotors is brought into rotation at a speed above a set value;

a valve disposed between the main pipe and the branched pipe and being normally closed for interrupting the fluid communication therebetween;

a sensor for detecting the rotational speed of the first turbine rotor; and control means for opening the valve based on a signal from the sensor when the detected rotational speed exceeds the set value.

2. A turbocharger according to claim 1 wherein the first turbine rotor is smaller in radius than the second turbine rotor.

3. A turbocharger according to claim 1 wherein the coupling means includes an input member having a concaved portion with a plurality of holes and being rotated together with the second turbine rotor, an output member having an end portion enclosed by the concaved portion of the input member and being rotated together with the first turbine rotor, and a plurality of pawls accommodated in the end portion of the output member and engageable with corresponding holes due to the centrifugal force when the rotational speed of the first turbine rotor reaches the set value.

4. A turbocharger for supercharging an engine provided with an intake pipe and an exhaust pipe including a main pipe and a branched pipe disposed in parallel thereto, comprising:

a compressor rotor disposed in the intake pipe;

a first turbine rotor disposed in the main pipe so as to be rotated by the pressure of the exhaust fluid therein and connected to the compressor rotor for the rotation thereof;

a second turbine rotor disposed in the branched pipe so as to be rotated by the pressure of the exhaust fluid therein;

coupling means for establishing the connection between the first and the second turbine rotors when one of the turbine rotors is brought into rotation at a speed above a set value;

a valve disposed between the main pipe and the branched pipe and being normally closed for interrupting the fluid communication therebetween;

a sensor for detecting the rotational speed of the second turbine rotor; and control means for opening the valve based on a signal from the sensor when the detected rotational speed exceeds the set value.

5. A turbocharger according to claim 4 wherein the coupling means is in the form of a multi-plate clutch.

6. A turbocharger according to claim 4 wherein the first turbine rotor is smaller in radius than the second turbine rotor.

* * * * *